United States Patent
Li et al.

(10) Patent No.: US 9,947,164 B2
(45) Date of Patent: Apr. 17, 2018

(54) AUTOMATIC FAULT DIAGNOSIS METHOD AND DEVICE FOR SORTING MACHINE

(71) Applicant: GRG Banking Equipment Co., Ltd., Guangzhou, Guangdong (CN)

(72) Inventors: Ming Li, Guangdong (CN); Guang Chen, Guangdong (CN)

(73) Assignee: GRG BANKING EQUIPMENT CO., LTD., Guangzhou, Guangdong (CN)

( * ) Notice: Subject to any disclaimer, the term of this patent is extended or adjusted under 35 U.S.C. 154(b) by 0 days.

(21) Appl. No.: 15/100,734

(22) PCT Filed: Oct. 23, 2014

(86) PCT No.: PCT/CN2014/089271
§ 371 (c)(1),
(2) Date: Jun. 1, 2016

(87) PCT Pub. No.: WO2015/081765
PCT Pub. Date: Jun. 11, 2015

(65) Prior Publication Data
US 2016/0300420 A1    Oct. 13, 2016

(30) Foreign Application Priority Data

Dec. 4, 2013  (CN) .......................... 2013 1 0648439

(51) Int. Cl.
*G06K 9/00* (2006.01)
*G07D 7/20* (2016.01)
(Continued)

(52) U.S. Cl.
CPC ......... *G07D 7/2016* (2013.01); *G06K 9/3275* (2013.01); *G06T 7/001* (2013.01);
(Continued)

(58) Field of Classification Search
CPC ................ G07D 7/20; G06K 9/00469; G06K 2017/0038; G06K 9/00442; G06Q 20/042;
(Continued)

(56) References Cited

U.S. PATENT DOCUMENTS 4,487,306 A * 12/1984 Nao .......................... G07D 7/12
194/207
4,931,963 A   6/1990 Kimura et al.
(Continued)

FOREIGN PATENT DOCUMENTS

CN    1340793 A    3/2002
CN    2686744 Y    3/2005
(Continued)

OTHER PUBLICATIONS

International Search Report for PCT/CN2014/089271, dated Jan. 30, 2015, ISA/CN.
(Continued)

*Primary Examiner* — Aaron W Carter
(74) *Attorney, Agent, or Firm* — U.S. Fairsky LLP; Yue Xu (57) ABSTRACT

A method and a device for automatically diagnosing a sorter fault are provided. The method includes: obtaining a banknote image of a banknote by scanning; performing data processing on the banknote image based on a preset detection algorithm, to obtain a processing result; and sending a feedback information if the processing result satisfies a preset condition.

4 Claims, 6 Drawing Sheets

(51) Int. Cl.
| | | |
|---|---|---|
| *G07D 11/00* | (2006.01) | |
| *G06K 9/32* | (2006.01) | |
| *G06T 7/00* | (2017.01) | |
| *G06T 7/90* | (2017.01) | |
| *G07D 7/183* | (2016.01) | |
| *G07D 7/17* | (2016.01) | |

(52) U.S. Cl.
CPC ............... *G06T 7/90* (2017.01); *G07D 7/17* (2017.05); *G07D 7/183* (2017.05); *G07D 11/0066* (2013.01); *G07D 11/0069* (2013.01); *G07D 11/0078* (2013.01); *G07D 11/0084* (2013.01); *G06T 2207/20072* (2013.01); *G06T 2207/30176* (2013.01)

(58) Field of Classification Search
CPC ....... B23Q 17/2409; G01N 2021/8858; G01N 2021/8864; G01N 2021/887; G01N 2021/8867; G01N 2021/8874; G01N 2021/8887; G01N 21/8806; G01N 21/93; G01N 21/9569
USPC .................. 382/135, 137, 140, 141
See application file for complete search history.

(56) References Cited

U.S. PATENT DOCUMENTS

| | | | | |
|---|---|---|---|---|
| 6,354,507 | B1* | 3/2002 | Maeda | G07D 7/20 235/454 |
| 7,131,539 | B2* | 11/2006 | Mukai | B65H 7/06 194/206 |
| 7,929,749 | B1 | 4/2011 | Jones et al. | |
| 8,107,713 | B2* | 1/2012 | Bickell | G06K 9/03 382/137 |
| 2002/0008138 | A1* | 1/2002 | Yamauchi | G07D 11/00 235/379 |
| 2004/0184673 | A1* | 9/2004 | Watanabe | G06T 5/009 382/274 |
| 2005/0244046 | A1* | 11/2005 | Yamamoto | G07D 7/20 382/135 |
| 2007/0041657 | A1* | 2/2007 | Rychagov | G06K 9/036 382/274 |
| 2008/0069423 | A1* | 3/2008 | Liu | G06K 9/346 382/137 |
| 2008/0069425 | A1* | 3/2008 | Liu | G07D 7/2016 382/137 |
| 2008/0069427 | A1* | 3/2008 | Liu | G06K 9/34 382/137 |
| 2009/0134567 | A1 | 5/2009 | Taniyama et al. | |
| 2009/0252437 | A1 | 10/2009 | Li | |
| 2010/0052237 | A1* | 3/2010 | Herczeg | B65H 7/00 271/3.16 |
| 2012/0031817 | A1 | 2/2012 | Yui | |
| 2013/0034291 | A1* | 2/2013 | Minin | G06K 9/00 382/137 |
| 2013/0044935 | A1* | 2/2013 | Minin | G07D 7/00 382/135 |
| 2014/0210161 | A1* | 7/2014 | Chen | G07D 7/00 271/272 |
| 2014/0219540 | A1* | 8/2014 | Drichel | G06K 9/3275 382/137 |
| 2015/0262040 | A9* | 9/2015 | Gorski | G06K 9/78 382/137 |
| 2015/0271397 | A1* | 9/2015 | Li | G06Q 20/042 382/135 |
| 2016/0225216 | A1* | 8/2016 | Wang | G06K 9/78 |
| 2016/0358399 | A1* | 12/2016 | Liang | G07D 7/164 |
| 2017/0193726 | A1* | 7/2017 | Yoon | G07D 7/121 |

FOREIGN PATENT DOCUMENTS

| | | |
|---|---|---|
| CN | 101430805 A | 5/2009 |
| CN | 101546451 A | 9/2009 |
| CN | 101826232 A | 9/2010 |
| CN | 101916382 A | 12/2010 |
| CN | 102034301 A | 4/2011 |
| CN | 102509383 A | 6/2012 |
| CN | 102831422 A | 12/2012 |
| CN | 103279735 A | 9/2013 |
| CN | 103606221 A | 2/2014 |
| DE | 102010046664 A1 | 3/2012 |
| JP | H0573602 A | 3/1993 |
| JP | H06295369 A | 10/1994 |
| JP | 2000172899 A | 6/2000 |
| JP | 2001273542 A | 10/2001 |
| JP | 2004070380 A | 3/2004 |
| JP | 2008250530 A | 10/2008 |
| WO | 2008002077 A2 | 1/2008 |

OTHER PUBLICATIONS

European Search Report for Application No. 14866959.1-1953/3079129, dated Dec. 23, 2016.

* cited by examiner

AUTOMATIC FAULT DIAGNOSIS METHOD AND DEVICE FOR SORTING MACHINE

This application is the national phase of international Application No. PCT/CN2014/089271, titled "AUTOMATIC FAULT DIAGNOSIS METHOD AND DEVICE FOR SORTING MACHINE", and filed on Oct. 23, 2014, which claims priority to Chinese Patent Application No. 201310648439.0, titled "AUTOMATIC FAULT DIAGNOSIS METHOD AND DEVICE FOR SORTING MACHINE", filed on Dec. 4, 2013 with the State Intellectual Property Office of the People's Republic of China, both of which are incorporated herein by reference in their entireties.

FIELD

The present disclosure relates to the field of automatic equipments, in particular to a method and a device for automatically diagnosing a sorter fault.

BACKGROUND

A sorter is a high-end financial tool product which entered China in the middle of 1990s, and is also referred to as a bill sorter, a cash sorter, a currency sorter or a banknote separator.

At present, due to insufficient lifetime, poor processing or bad environmental adaptability of some parts, the sorter often causes abnormal movements, increased wear and other faults of the banknote, in the process of research and development or in the process of being used in the field by a user. In addition, a signal of a sensor becomes abnormal due to dust and aging of a banknote identification module. For the sorter maintaining in the conventional technology, a maintainer is usually sent to analyze and handle a fault after the fault has occurred in the sorter.

However, if the maintainer is sent to analyze the fault after the fault has occurred in the sorter, the maintainer can not get related historical data. Therefore, the difficulty in analyzing the fault and the time for handling the fault are increased.

SUMMARY

A method and a device for automatically diagnosing a sorter fault are provided according to embodiments of the present disclosure, to determine whether there is a potential fault in the sorter and analyze the sorter fault, which can reduce the difficulty in analyzing the fault and the time for processing the fault.

A method for automatically diagnosing a sorter fault, including:
  obtaining, a banknote image of a banknote, by scanning;
  performing, data processing, on the banknote image, based on a preset detection algorithm, to obtain a processing result; and
  sending, feedback information, in a case that a preset condition is met by the processing result.

A device for automatically diagnosing a sorter fault, including:
  a scanning module, configured to obtain a banknote image of a banknote by scanning;
  a processing module, configured to perform data processing on the banknote image based on a preset detection algorithm to obtain a processing result; and
  a feedback module, configured to send feedback information in a case that a preset condition is met by the processing result.

It can be seen from the above technical solutions that the embodiments of the present disclosure have the following advantages.

According to the embodiments of the present disclosure, with the device for automatically diagnosing the sorter fault, the banknote image of the banknote is obtained by scanning; the data processing is performed on the banknote image based on the preset detection algorithm to obtain the processing result; and the feedback information is sent in a case that the preset condition is met by the processing result. According to the embodiments of the present disclosure, with the device for automatically diagnosing the sorter fault, the data processing can be performed on the banknote image to obtain the processing result, and the feedback information is sent to notify a maintainer, so that the maintainer may determine whether there is a potential fault in the sorter based on the feedback information, instead of analyzing the fault after the fault has occurred in the sorter. In addition, since the processing result and the feedback information are provided to the maintainer, the difficulty in analyzing the fault and the time for processing the fault are reduced.

DETAILED DESCRIPTION

A method and a device for automatically diagnosing a sorter fault are provided according to embodiments of the present disclosure, to determine whether there is a potential fault in the sorter and analyze the sorter fault, which can reduce the difficulty in analyzing the fault and the time for handling the fault.

Figure 1:
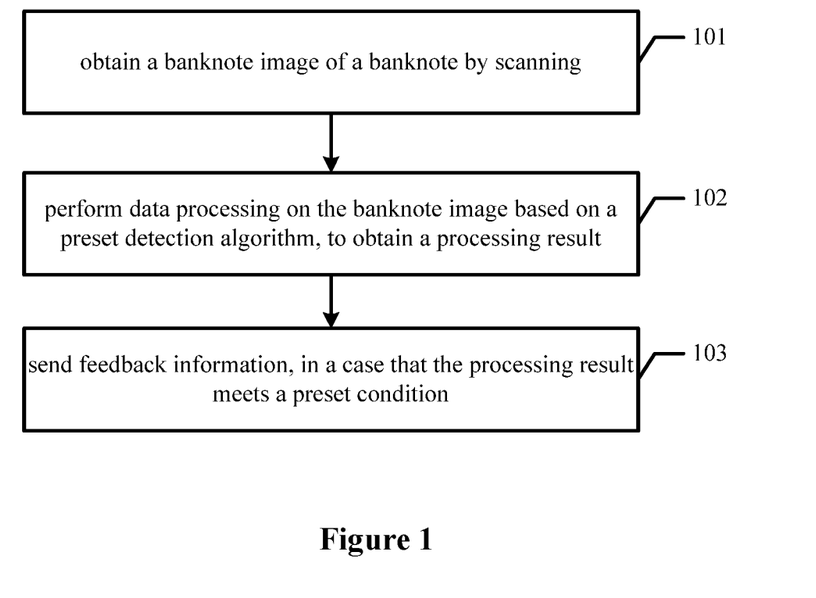
FIG. 1 is a flow chart of a method for automatically diagnosing a sorter fault according to an embodiment of the present disclosure.

Reference is made to FIG. 1, a method for automatically diagnosing a sorter fault according to an embodiment of the present disclosure includes steps 101 to 103.

In step 101, a banknote image of a banknote is obtained by scanning.

The device for automatically diagnosing the sorter fault obtains the banknote image of the banknote by scanning after receiving an execution instruction.

It can be understood that the execution instruction may be sent to the device for automatically diagnosing the sorter fault by various means, for example, by means of sending the execution instruction to the device for automatically diagnosing the sorter fault based on setting a fixed time interval, by means of sending the execution instruction to the device for automatically diagnosing the sorter fault when the sorter is counting banknotes, or by means of sending the execution instruction to the device for automatically diagnosing the sorter fault by an operator manually, which is not limited herein.

In step 102, data processing is performed on the banknote image based on a preset detection algorithm, to obtain a processing result.

After obtaining the banknote image of the banknote, the device for automatically diagnosing the sorter fault performs the data processing on the banknote image based on the preset detection algorithm, to obtain the processing result.

In step 103, feedback information is sent in a case that the processing result meets a preset condition.

The device for automatically diagnosing the sorter fault sends the feedback information after obtaining the processing result, in a case that the processing result meets the preset condition.

It can be understood that the feedback information may be sent to a monitor platform on a remote end rather than to a maintainer, and may be viewed on the monitor platform on the remote end when the maintainer on duty checks or when needed.

According to the embodiment, the device for automatically diagnosing the sorter fault obtains the banknote image of the banknote by scanning, performs the data processing on the banknote image based on the preset detection algorithm, to obtain the processing result, and sends the feedback information in a case that the processing result meets the preset condition. According to the embodiment, the device for automatically diagnosing the sorter fault may perform the data processing on the banknote image, to obtain the processing result, and may send the feedback information to notify the maintainer, so that the maintainer may determine whether there is a potential fault in the sorter based on the feedback information, instead of analyzing the fault after the fault has occurred in the sorter. In addition, since the processing result and the feedback information are provided to the maintainer, the difficulty in analyzing the fault and the time for processing the fault are reduced.

Figure 2:
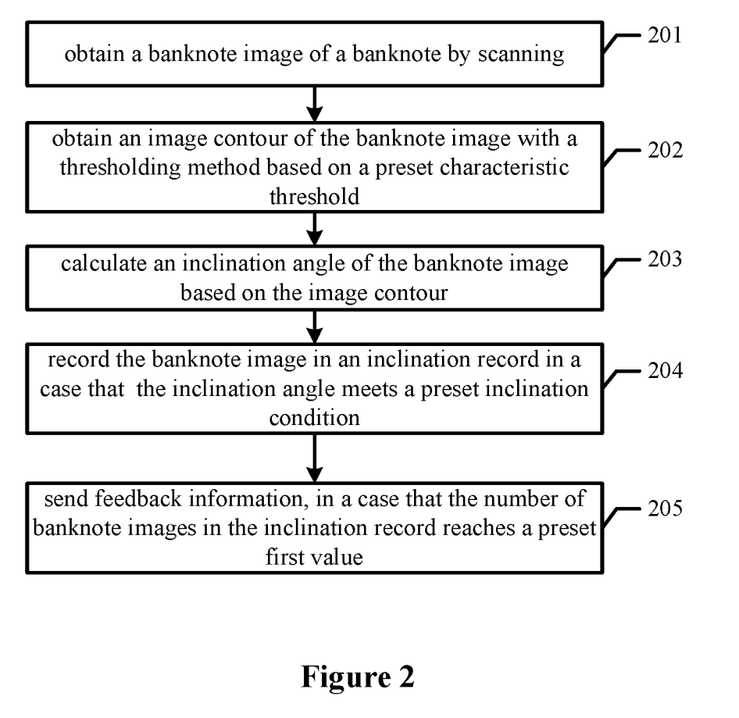
FIG. 2 is a flow chart of a method for automatically diagnosing a sorter fault according to another embodiment of the present disclosure.

To facilitate understanding, a method for automatically diagnosing a sorter fault according to an embodiment of the present disclosure is described in detail with an example. Reference is made to FIG. 2, the method for automatically diagnosing the sorter fault according to another embodiment of the present disclosure includes steps 201 to 205.

In step 201, a banknote image of a banknote is obtained by scanning.

The device for automatically diagnosing the sorter fault obtains the banknote image of the banknote by scanning after receiving an execution instruction.

It can be understood that the execution instruction may be sent to the device for automatically diagnosing the sorter fault by various means, for example, by means of sending the execution instruction to the device for automatically diagnosing the sorter fault based on setting a fixed time interval, by means of sending the execution instruction to the device for automatically diagnosing the sorter fault when the sorter is counting banknotes, or by means of sending the execution instruction to the device for automatically diagnosing the sorter fault by an operator manually, which is not limited herein.

In step 202, an image contour of the banknote image is obtained with a thresholding method based on a preset characteristic threshold.

After obtaining the banknote image of the banknote, the device for automatically diagnosing the sorter fault obtains the image contour of the banknote image with the thresholding method based on the preset characteristic threshold.

The characteristic threshold needs to be preset in the device for automatically diagnosing the sorter fault by the operator before being executed by the device for automatically diagnosing the sorter fault. A value of the characteristic threshold may be determined by algorithm characteristics of the thresholding method and industry experience of the operator, and may be adjusted by the operator based on a specific implementation scenario to obtain an image contour with higher resolution.

In step 203, an inclination angle of the banknote image is calculated based on the image contour.

After obtaining the image contour of the banknote image, the device for automatically diagnosing the sorter fault calculates the inclination angle of the banknote image based on the image contour.

Specifically, four corner points, i.e., an upper-left corner point, a lower-left corner point, an upper-right corner point and a lower-right corner point, of the image contour are found with a template searching method, and then an angle of connection between the upper-left corner point and the upper-right corner point is calculated, so as to obtain the inclination angle of the banknote image, which is not limited herein.

In step 204, the banknote image is recorded in an inclination record in a case that the inclination angle meets a preset inclination condition.

After calculating and obtaining the inclination angle of the banknote image, the device for automatically diagnosing the sorter fault records the banknote image in the inclination record in a case that the inclination angle meets the preset inclination condition.

It should be noted that, there may be multiple types of inclination conditions, such as being equal to a specific inclination value, being within a specific inclination interval and being greater than a specific inclination value, which may be preset by the operator. The inclination record is to store the banknote image that meets the condition, may provide historical data for the operator to maintain the sorter in the future, and may lay the basis for the next step 205.

In step 205, feedback information is sent in a case that the number of banknote images in the inclination record reaches a preset first value.

In a case that the number of the banknote images in the inclination record reaches the preset first value, the device for automatically diagnosing the sorter fault sends the feedback information to notify a maintainer.

As the banknote images in the inclination record become more and more, the number of the banknote images may reach, at a particular moment, the preset first value preset by the operator. In this case, the device for automatically diagnosing the sorter fault may consider that inclination of banknotes during the sorting of the banknotes is due to a potential fault in the sorter, therefore, the device for automatically diagnosing the sorter fault sends the feedback information to notify the maintainer. The feedback information may be sent to a monitor platform on a remote end rather than to the maintainer, and the feedback information may be viewed on the monitor platform on the remote end when the maintainer on duty checks or when needed, which is not limited herein.

According to the embodiment, the device for automatically diagnosing the sorter fault may obtain the image contour of the banknote image, and calculate the inclination angle of the image contour. The banknote image is recorded in the inclination record in a case that the inclination angle meets the preset condition, and the feedback information is sent to notify the maintainer in a case that the number of the banknote images in the inclination record reaches the preset first value, so that the maintainer can learn that there is a potential fault of banknote inclination in the sorter, instead of analyzing the fault after the fault has occurred in the sorter. In addition, since the inclination record and the feedback information are provided to the maintainer for analysis, the difficulty in analyzing the fault and the time for handling the fault are reduced.

Figure 3:
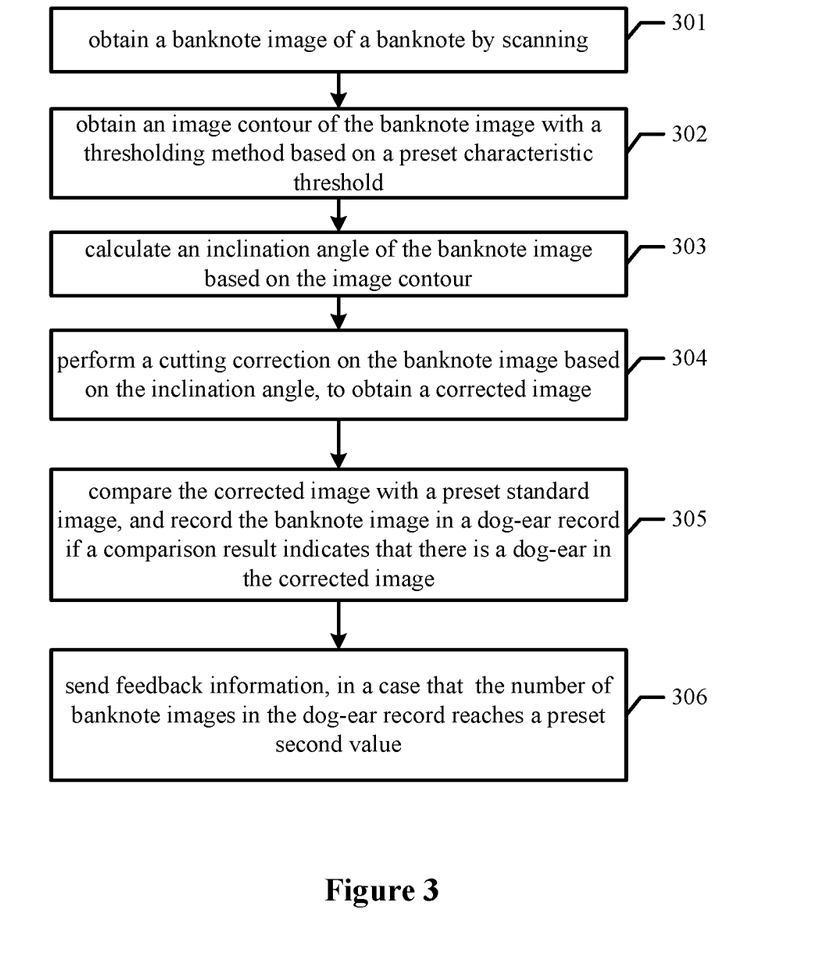
FIG. 3 is a flow chart of a method for automatically diagnosing a sorter fault according to still another embodiment of the present disclosure.

The method for automatically diagnosing the sorter fault, which is about diagnosing the potential fault of the banknote inclination, is described in the above embodiment. A method for automatically diagnosing a sorter fault is described in detail hereinafter in terms of diagnosing a potential fault of a banknote dog-ear. Reference is made to FIG. 3. The method for automatically diagnosing the sorter fault according to another embodiment of the present disclosure includes steps 301 to 306.

In step 301, a banknote image of a banknote is obtained by scanning.

After receiving an execution instruction, a device for automatically diagnosing the sorter fault obtains the banknote image of the banknote by scanning.

It can be understood that the execution instruction may be sent to the device for automatically diagnosing the sorter fault by various means, for example, by means of sending the execution instruction to the device for automatically diagnosing the sorter fault based on setting a fixed time interval, by means of sending the execution instruction to the device for automatically diagnosing the sorter fault when the sorter is counting banknotes, or by means of sending the execution instruction to the device for automatically diagnosing the sorter fault by an operator manually, which is not limited herein.

In step 302, an image contour of the banknote image is obtained with a thresholding method based on a preset characteristic threshold.

After obtaining the banknote image of the banknote, the device for automatically diagnosing the sorter fault obtains the image contour of the banknote image with the thresholding method based on the preset characteristic threshold.

The characteristic threshold needs to be preset in the device for automatically diagnosing the sorter fault by the operator before being executed by the device for automatically diagnosing the sorter fault. A value of the characteristic threshold may be determined by algorithm characteristics of the thresholding method and industry experience of the operator, and may be adjusted by the operator based on a specific implementation scenario to obtain an image contour with higher resolution.

In step 303, an inclination angle of the banknote image is calculated based on the image contour.

After obtaining the image contour of the banknote image, the device for automatically diagnosing the sorter fault calculates the inclination angle of the banknote image based on the image contour.

Specifically, four corner points, i.e., an upper-left corner point, a lower-left corner point, an upper-right corner point and a lower-right corner point, of the image contour are found with a template searching method, and then an angle of connection between the upper-left corner point and the upper-right corner point is calculated, so as to obtain the inclination angle of the banknote image, which is not limited herein.

In step 304, a cutting correction is performed on the banknote image based on the inclination angle, to obtain a corrected image.

After the inclination angle of the banknote image is obtained, the cutting correction is performed on the banknote image based on the inclination angle, to obtain the corrected image.

In step 305, the corrected image is compared with a preset standard image, and the banknote image is recorded in a dog-ear record if a comparison result indicates that there is a dog-ear in the corrected image.

After obtaining the corrected image, the device for automatically diagnosing the sorter fault compares the corrected image with the preset standard image, and the banknote image is recorded in the dog-ear record if the comparison result indicates that there is a dog-ear in the corrected image.

Specifically, the corrected image is segmented into a foreground and a background to form a binary image. A grayscale value of the foreground may be 0, and a grayscale value of the background may be 255. Then, the number of pixels with grayscale values of 255 in preset areas where four corner points of the binary image are located is calculated, and a obtained result is compared with a standard result corresponding to the preset standard image, so as to obtain the corner point which is located in an area with a dog-ear. In a case that there is a dog-ear, the banknote image is recorded in the dog-ear record. The dog-ear record is to store a banknote image with a dog-ear, may provide historical data for the operator to maintain the sorter in the future, and may lay the basis for the next step 306.

In step 306, feedback information is sent in a case that the number of banknote images in the dog-ear record reaches a preset second value.

In a case that the number of the banknote images in the dog-ear record reaches the preset second value, the device for automatically diagnosing the sorter fault sends the feedback information to notify a maintainer.

As the banknote images in the dog-ear record become more and more, the number of the banknote images may reach, at a particular moment, the preset second value preset by the operator. In this case, the device for automatically diagnosing the sorter fault may consider that dog-ears of banknotes during the sorting of the banknotes are due to a potential fault in the sorter, therefore, the device for automatically diagnosing the sorter fault sends the feedback information to notify the maintainer. The feedback information may be sent to a monitor platform on a remote end rather than to the maintainer, and may be viewed on the monitor platform on the remote end when the maintainer on duty checks or when needed, which is not limited herein.

According to the embodiment, the device for automatically diagnosing the sorter fault may obtain the image contour of the banknote image, calculate the inclination angle of the image contour, and perform the cutting correction on the banknote image based on the inclination angle, to obtain the corrected image. The device for automatically diagnosing the sorter fault compares the corrected image with the preset standard image, and records the banknote image in the dog-ear record if the comparison result indicates that there is a dog-ear in the corrected image. If the number of the banknote images in the dog-ear record reaches the second preset value, the device for automatically diagnosing the sorter fault sends the feedback information to notify the maintainer, so that the maintainer can learn that there is a potential fault of banknote dog-ear in the sorter, instead of analyzing the fault after the fault has occurred in the sorter. In addition, since the dog-ear record and the feedback information are provided to the maintainer, the difficulty in analyzing the fault and the time for handling the fault are reduced.

Figure 4:
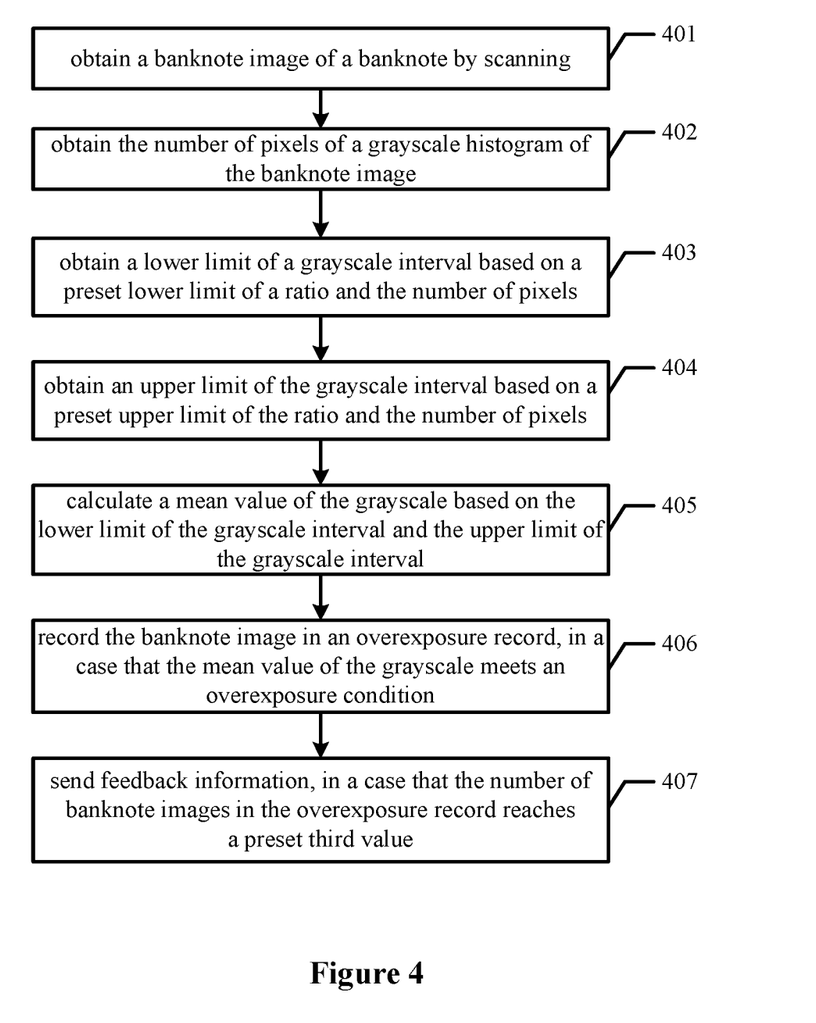
FIG. 4 is a flow chart of a method for automatically diagnosing a sorter fault according to yet another embodiment of the present disclosure.

The method for automatically diagnosing the sorter fault, which is about diagnosing the potential fault of banknote dog-ear, is described in the above embodiment. A method for automatically diagnosing a sorter fault is described in detail hereinafter in terms of diagnosing a potential fault of banknote overexposure. Reference is made to FIG. 4, the method for automatically diagnosing the sorter fault according to another embodiment of the present disclosure includes steps 401 to 406.

In step 401, a banknote image of a banknote is obtained by scanning.

After receiving an execution instruction, a device for automatically diagnosing the sorter fault obtains the banknote image of the banknote by scanning.

It can be understood that the execution instruction may be sent to the device for automatically diagnosing the sorter fault by various means, for example, by means of sending the execution instruction to the device for automatically diagnosing the sorter fault based on setting a fixed time interval, by means of sending the execution instruction to the device for automatically diagnosing the sorter fault when the sorter is counting banknotes, or by means of sending the execution instruction to the device for automatically diagnosing the sorter fault by an operator manually, which is not limited herein.

In step 402, the number of pixels of a grayscale histogram of the banknote image is obtained.

After obtaining the banknote image, the device for automatically diagnosing the sorter fault calculates the number of pixels of the grayscale histogram of the banknote image. It should be noted that, the number of pixels of the grayscale histogram may be directly obtained during converting the banknote image to a corresponding grayscale histogram.

In step 403, a lower limit of a grayscale interval is obtained based on a preset lower limit of a ratio and the number of pixels.

After obtaining the number of pixels, the device for automatically diagnosing the sorter fault obtains the lower limit of the grayscale interval based on the preset lower limit of the ratio and the number of pixels. A value of the lower limit of the grayscale interval may be obtained by multiplying the lower limit of the ratio by the number of pixels.

In step 404, an upper limit of the grayscale interval is obtained based on a preset upper limit of a ratio and the number of pixels.

After obtaining the number of pixels, the device for automatically diagnosing the sorter fault obtains the upper limit of the grayscale interval based on the preset upper limit of the ratio and the number of pixels. A value of the upper limit of the grayscale interval may be obtained by multiplying the upper limit of the ratio by the number of pixels.

In step 405, a mean value of grayscale is calculated based on the lower limit of the grayscale interval and the upper limit of the grayscale interval.

After the lower limit of the grayscale interval and the upper limit of the grayscale interval are obtained, the mean value of the grayscale may be calculated.

In step 406, the banknote image is recorded in an overexposure record, in a case that an overexposure condition is met by the mean value of the grayscale.

After calculating and obtaining the mean value of the grayscale of the banknote image, the device for automatically diagnosing the sorter fault records the banknote image in the overexposure record in a case that the mean value of the grayscale meets the overexposure condition.

It should be noted that there may be multiple types of overexposure conditions, such as being equal to a specific grayscale value, being within a specific grayscale interval and being greater than a specific grayscale value, which may be preset by the operator. The overexposure record is to store a banknote image that meets the condition, may provide historical data for the operator to maintain the sorter in the future, and may lay the basis for the next step 407.

In step 407, feedback information is sent in a case that the number of banknote images in the overexposure record meets a preset third value.

In a case that the number of the banknote images in the overexposure record reaches the preset third value, the device for automatically diagnosing the sorter fault sends the feedback information to notify a maintainer.

As the banknote images in the overexposure record become more and more, the number of the banknote images may reach, at a particular moment, the preset third value preset by the operator. In this case, the device for automatically diagnosing the sorter fault may consider that overexposure of banknotes during the sorting of the banknotes is due to a potential fault in the sorter, therefore, the device for automatically diagnosing the sorter fault sends the feedback information to notify the maintainer. The feedback information may be sent to a monitor platform on a remote end rather than to the maintainer, and the feedback information may be viewed on the monitor platform on the remote end when the maintainer on duty checks or when needed, which is not limited herein.

According to the embodiment, the device for automatically diagnosing the sorter fault may obtain the banknote image and the number of pixels of the grayscale histogram of the banknote image, obtain the lower limit of the grayscale interval based on the preset lower limit of the ratio and the number of pixels and obtain the upper limit of the grayscale interval based on the preset upper limit of the ratio and the number of pixels, and calculate the mean value of the grayscale based on the lower limit of the grayscale interval and the upper limit of the grayscale interval. In a case that the mean value of the grayscale meets the overexposure condition, the device for automatically diagnosing the sorter fault records the banknote image in the overexposure record. In a case that the number of the banknote images in the overexposure record reaches the third preset value, the device for automatically diagnosing the sorter fault sends the feedback information to notify the maintainer, so that the maintainer can learn that there is a potential fault of banknote overexposure in the sorter, instead of analyzing the fault after the fault has occurred in the sorter. In addition, since the overexposure record and the feedback information are provided to the maintainer, the difficulty in analyzing the fault and the time for processing the fault are reduced.

It should be noted that, the methods for automatically diagnosing the sorter fault, which are about diagnosing the potential fault of banknote inclination, banknote dog-ear and banknote overexposure, are described according to the embodiments shown in FIG. 2, FIG. 3 and FIG. 4. The methods for automatically diagnosing the sorter fault according to the embodiments shown in FIG. 2, FIG. 3 and FIG. 4 may be combined to diagnose the potential faults of banknote inclination, banknote dog-ear and banknote overexposure. A method for automatically diagnosing a sorter fault, which combines the methods shown in FIG. 2, FIG. 3 and FIG. 4, is described in detail hereinafter based on a practical application scenario.

Before first use, the device for automatically diagnosing the sorter fault is preset by an operator, in terms of a first value, a second value, a third value, etc., which is not described in detail.

When a sorter is counting banknotes, the device for automatically diagnosing the sorter fault receives an execution instruction, to scan the banknote and obtain a banknote image A of the banknote.

The device for automatically diagnosing the sorter fault obtains an image contour B of the banknote image A with a thresholding method based on a preset characteristic threshold, finds out four corner points, assumed as an upper-left corner point a, a lower-left corner point b, an upper-right corner point c and a lower-right corner point d, of the image contour B, calculates an inclination angle of connection between a and c, and obtains that the inclination angle C is 30 degree.

A preset inclination condition is that the inclination angle is greater than 20 degree, therefore the inclination angle C meets the preset inclination condition, and the banknote image A is recorded in an inclination record. In a case that the number of banknote images in the inclination record reaches 10, the device for automatically diagnosing the sorter fault sends warning information and the inclination record to a platform on a remote end.

In another aspect, the device for automatically diagnosing the sorter fault performs a cutting correction on the banknote image A based on the inclination angle C, and obtains a corrected image D. Then, the device for automatically diagnosing the sorter fault converts the corrected image D to a binary image E. It is assumed that four corner points of the image E are an upper-left corner point aa, a lower-left corner point bb, an upper-right corner point cc and a lower-right corner point dd respectively, and four areas with fixed sizes corresponding to the four corner points are an area AREA1 corresponding to the corner point aa, an area AREA2 corresponding to the corner point bb, an area AREA3 corresponding to the corner point cc and an area AREA4 corresponding to the corner point dd respectively. Pixels with grayscale values of 255 are searched for in the areas, and the numbers of the pixels are calculated. Search results indicate that the number of pixels in AREA1 is 110, the number of pixels in AREA2 is 120, the number of pixels in AREA3 is 115 and the number of pixels in AREA4 is 95. The results corresponding to AREA1, AREA2, AREA3 and AREA4 are compared with a standard result corresponding to a standard image respectively. It is assumed that the standard result is 100, there is no dog-ear in an area with a result being greater than the standard result, and there is a dog-ear in an area with a result being less than the standard result, thus there is a dog-ear in AREA4. Therefore, the banknote image A is recorded in a dog-ear record.

In a case that the number of banknote images in the dog-ear record reaches 10, the device for automatically diagnosing the sorter fault sends warning information and the dog-ear record to the platform on the remote end.

In another aspect, the device for automatically diagnosing the sorter fault calculates the number of pixels of a grayscale histogram of the banknote image A after obtaining the banknote image A. It is assumed that the number of pixels is 1000, a preset lower limit of a ratio is 5%, and a preset upper limit of the ratio is 90%, then a grayscale interval (50, 900) may be obtained by multiplication, and a mean value 475 of the grayscale in the grayscale interval (50, 900) is obtained through calculation. A preset overexposure condition is that the mean value of the grayscale is within a grayscale interval (400, 600), thus the mean value 475 of the grayscale meets the condition, and the banknote image A is recorded in an overexposure record.

In a case that the number of banknote images in the overexposure record reaches 10, the device for automatically diagnosing the sorter fault sends warning information and the dog-ear record is sent to the platform on the remote end by.

Figure 5:
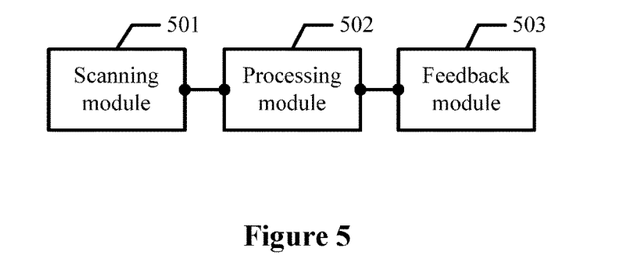
FIG. 5 is a structural diagram of a device for automatically diagnosing a sorter fault according to an embodiment of the present disclosure.

The method for automatically diagnosing the sorter fault according to the embodiments of the present disclosure is described above. A device for automatically diagnosing a sorter fault according to an embodiment of the present disclosure is described hereinafter. Reference is made to FIG. 5, the device for automatically diagnosing the sorter fault according to the embodiment of the present disclosure includes a scanning module 501, a processing module 502, and a feedback module 503.

The scanning module 501 is configured to obtain a banknote image of a banknote by scanning.

The processing module 502 is configured to perform data processing on the banknote image based on a preset detection algorithm, to obtain a processing result.

The feedback module 503 is configured to send feedback information in a case that the processing result meets a preset condition.

According to the embodiment, the scanning module 501 obtains the banknote image of the banknote by scanning, the processing module 502 performs the data processing on the banknote image based on the preset detection algorithm to obtain the processing result. In a case that the processing result meets the preset condition, the feedback module 503 sends the feedback information to notify a maintainer. According to the embodiment, the device for automatically diagnosing the sorter fault may perform the data processing on the banknote image to obtain the processing result, and send the feedback information to notify the maintainer, so that the maintainer can determine whether there is a potential fault in the sorter based on the feedback information, instead of analyzing the fault after the fault has occurred in the sorter. In addition, since the processing result and the feedback information are provided to the maintainer for analysis, the difficulty in analyzing the fault and the time for processing the fault are reduced.

Figure 6:
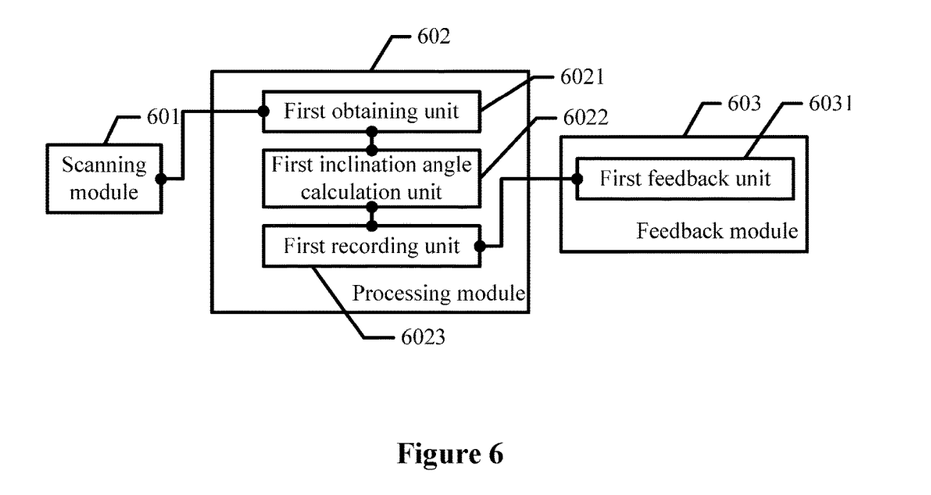
FIG. 6 is a structural diagram of a device for automatically diagnosing a sorter fault according to another embodiment of the present disclosure.

To facilitate understanding, a device for automatically diagnosing a sorter fault according to an embodiment of the present disclosure is described in detail with a specific example. Reference is made to FIG. 6, the device for automatically diagnosing the sorter fault according to another embodiment of the present disclosure includes a scanning module 601, a processing module 602, and a feedback module 603.

The scanning module 601 is configured to obtain a banknote image of a banknote by scanning.

The processing module 602 is configured to perform data processing on the banknote image based on a preset detection algorithm, to obtain a processing result.

The feedback module 603 is configured to send feedback information in a case that the processing result meets a preset condition.

The processing module 602 according to the embodiment may include a first obtaining unit 6021, a first inclination angle calculation unit 6022, and a first recording unit 6023.

The first obtaining unit 6021 is configured to obtain an image contour of the banknote image with a thresholding method based on a preset characteristic threshold.

The first inclination angle calculation unit 6022 is configured to calculate an inclination angle of the banknote image based on the image contour.

The first recording unit 6023 is configured to record the banknote image in an inclination record in a case that the inclination angle meets a preset inclination condition.

The feedback module 603 according to the embodiment may include a first feedback unit 6031.

The first feedback unit 6031 is configured to send feedback information in a case that the number of banknote images in the inclination record reaches a first preset value.

According to the embodiment, the scanning module 601 obtains the banknote image of the banknote by scanning, the first obtaining unit 6021 obtains the image contour of the banknote image with the thresholding method based on the preset characteristic threshold, the first inclination angle calculation unit 6022 calculates the inclination angle of the banknote image based on the image contour, the first recording unit 6023 records the banknote image in the inclination record in a case that the inclination angle meets the preset condition, and the first feedback unit 6031 sends the feedback information to notify a maintainer in a case that the number of the banknote images in the inclination record reaches the preset first value is reached by, so that the maintainer can learn that there is a potential fault of banknote inclination in the sorter, instead of analyzing the fault after the fault has occurred in the sorter. In addition, since the inclination record and the feedback information are provided to the maintainer, the difficulty in analyzing the fault and the time for processing the fault are reduced.

Figure 7:
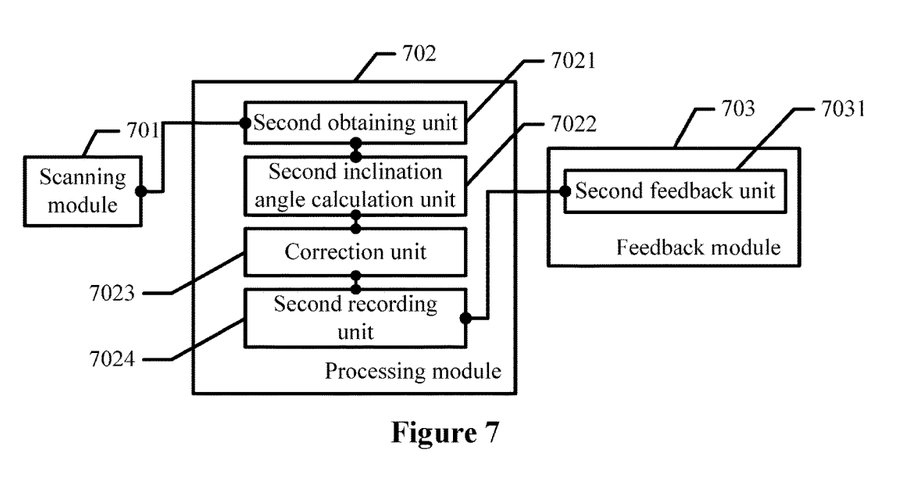
FIG. 7 is a structural diagram of a device for automatically diagnosing a sorter fault according to still another embodiment of the present disclosure.

The device for automatically diagnosing the sorter fault, which is about diagnosing the potential fault of banknote inclination, is described in the above embodiment. A device for automatically diagnosing a sorter fault is described in detail hereinafter, in terms of diagnosing a potential fault of banknote dog-ear. Reference is made to FIG. 7, the device for automatically diagnosing the sorter fault according to another embodiment of the present disclosure includes a scanning module 701, a processing module 702, and a feedback module 703.

The scanning module 701 is configured to obtain a banknote image of a banknote by scanning.

The processing module 702 is configured to perform data processing on the banknote image based on a preset detection algorithm, to obtain a processing result.

The feedback module 703 is configured to send feedback information in a case that the processing result meets a preset condition.

The processing module 702 according to the embodiment may include a second obtaining unit 7021, a second inclination angle calculation unit 7022, a correction unit 7023, and a second recording unit 7024.

The second obtaining unit 7021 is configured to obtain an image contour of the banknote image with a thresholding method based on a preset characteristic threshold.

The second inclination angle calculation unit 7022 is configured to calculate an inclination angle of the banknote image based on the image contour.

The correction unit 7023 is configured to perform a cutting correction on the banknote image based on the inclination angle, to obtain a corrected image.

The second recording unit 7024 is configured to compare the corrected image with a preset standard image, and record the banknote image in a dog-ear record if a comparison result indicates that there is a dog-ear in the corrected image.

The feedback module 703 according to the embodiment may include a second feedback unit 7031.

The second feedback unit 7031 is configured to send feedback information in a case that the number of banknote images in the dog-ear record reaches a preset second value.

According to the embodiment, the scanning module 701 obtains the banknote image of the banknote by scanning, the second obtaining unit 7021 obtains the image contour of the banknote image, the second inclination angle calculation unit 7022 calculates the inclination angle of the image contour, the correction unit 7023 performs the cutting correction on the banknote image based on the inclination angle, to obtain the corrected image, the second recording unit 7024 compares the corrected image with the preset standard image, records the banknote image in the dog-ear record if the comparison result indicates that there is a dog-ear in the corrected image, and the second feedback unit 7031 sends the feedback information to notify a maintainer in a case that the number of the banknote images in the dog-ear record reaches the preset second value, so that the maintainer can learn that there is a potential fault of banknote dog-ear in the sorter, instead of analyzing the fault after the fault has occurred in the sorter. In addition, since the dog-ear record and the feedback information are provided to the maintainer, the difficulty in analyzing the fault and the time for processing the fault are reduced.

Figure 8:
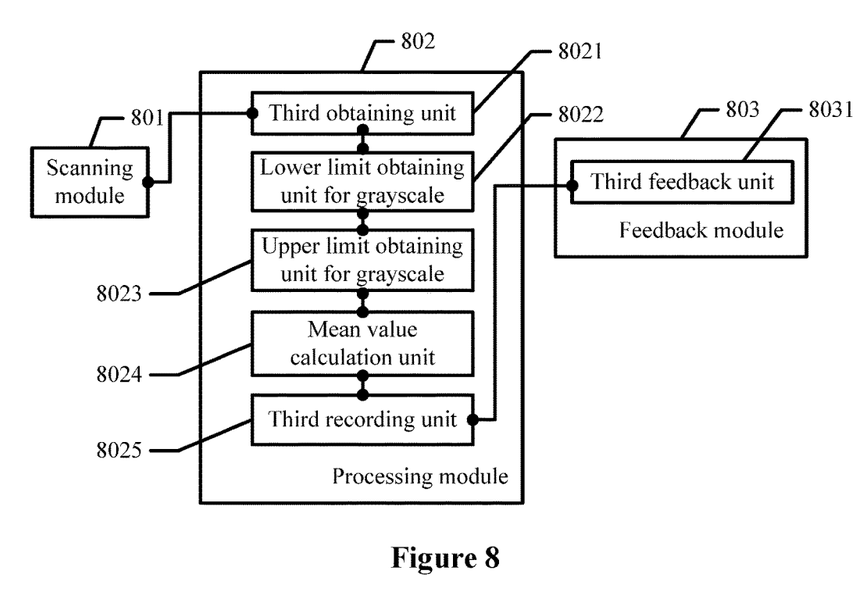
FIG. 8 is a structural diagram of a device for automatically diagnosing a sorter fault according to yet another embodiment of the present disclosure.

The device for automatically diagnosing the sorter fault, which is about diagnosing the potential fault of banknote dog-ear, is described in the above embodiment. A device for automatically diagnosing a sorter fault is described in detail hereinafter, in terms of diagnosing a potential fault of banknote overexposure. Reference is made to FIG. 8, the device for automatically diagnosing the sorter fault according to another embodiment of the present disclosure includes a scanning module 801, a processing module 802, and a feedback module 803.

The scanning module 801 is configured to obtain a banknote image of a banknote by scanning.

The processing module 802 is configured to perform data processing on the banknote image based on a preset detection algorithm, to obtain a processing result.

The feedback module 803 is configured to send feedback information in a case that the processing result meets a preset condition.

The processing module 802 according to the embodiment may include a third obtaining unit 8021, a lower limit obtaining unit 8022 for the grayscale, an upper limit obtaining unit 8023 for the grayscale, a mean value calculation unit 8024, and a third recording unit 8025.

The third obtaining unit 8021 is configured to obtain the number of pixels of a grayscale histogram of the banknote image.

The lower limit obtaining unit 8022 for the grayscale is configured to obtain a lower limit of a grayscale interval based on a preset lower limit of a ratio and the number of the pixels.

The upper limit obtaining unit 8023 for the grayscale is configured to obtain an upper limit of the grayscale interval based on a preset upper limit of the ratio and the number of the pixels.

The mean value calculation unit 8024 is configured to calculate a mean value of the grayscale based on the lower limit of the grayscale interval and the upper limit of the grayscale interval.

The third recording unit 8025 is configured to record the banknote image in an overexposure record in a case that the mean value of the grayscale meets a preset overexposure condition.

The feedback module 803 according to the embodiment may include a third feedback unit 8031.

The third feedback unit 8031 is configured to send feedback information in a case that the number of banknote images in the overexposure record reaches a preset third value.

According to the embodiment, the scanning module 801 may obtain the banknote image of the banknote, the third obtaining unit 8021 obtains the number of pixels of the grayscale histogram of the banknote image, the lower limit obtaining unit 8022 for the grayscale obtains the lower limit of the grayscale interval based on the preset lower limit of the ratio and the number of pixels, the upper limit obtaining unit 8023 for the grayscale obtains the upper limit of the grayscale interval based on the preset upper limit of the ratio and the number of pixels, the mean value calculation unit 8024 calculates the mean value of the grayscale based on the lower limit of the grayscale interval and the upper limit of the grayscale interval, the third recording unit 8025 records the banknote image in the overexposure record in a case that the mean value of the grayscale meet the preset overexposure condition, and the third feedback unit 8031 sends the feedback information to notify the maintainer in a case that the number of the banknote images in the overexposure record reaches the preset third value, so that the maintainer can learn that there is a potential fault of banknote overexposure in the sorter, instead of analyzing the fault after the fault has occurred in the sorter. In addition, since the overexposure record and the feedback information are provided to the maintainer, the difficulty in analyzing the fault and the time for processing the fault are reduced.

Those skilled in the art may clearly understand that, for specific operation processes of the systems, devices and units described above, references may be made to the corresponding processes in the above method embodiments for convenience and simplicity of description, which is not described herein.

It should be understood that, the disclosed systems, devices and methods according to the embodiments of the present disclosure may be implemented in other ways. For example, the device embodiments described above are illustrative only. For example, the units are divided merely based on logical functions and may be divided in other ways in actual implementation. For example, multiple units or components may be combined or integrated into another system, or some features may be omitted or not performed. In addition, the displayed or discussed mutual coupling, direct coupling or communication connection may be indirect coupling or communication connection via some interfaces, devices or units, and may be implemented electrically, mechanically or in other forms.

The units described as separate parts may be or may not be physically separate, and parts displayed as units may be or may not be physical units, which may be located in one position or distributed on multiple network units. A part of or all of the units may be selected to achieve the object of solutions in the embodiments of the present disclosure based on practical requirements.

In addition, the functional units in the embodiments of the present disclosure may be integrated into one processing unit, or the units may exist separately, or, two or more units may be integrated into one unit. The above integrated unit may be implemented in a form of hardware or in a form of software functional units.

If the integrated unit is implemented in the form of software functional units and is sold or used as a separate product, the software functional units may be stored in a computer readable storage medium. Based on such understanding, the essence of the technical solutions, part of the technical solutions which contributes to the conventional technology, or all of or part of the technical solutions of the present disclosure may be implemented in a form of a software product. The computer software product is stored in a storage medium and includes several instructions to make a computer device (which may be a personal computer, a server, a network device, etc.) to execute all of or some of the steps in the methods according to the embodiments of the present disclosure. The above storage medium includes various media that can store programs, for example, a USB flash disk, a mobile hard disk, a read-only memory (Read-Only Memory, ROM), a random access memory (Random Access Memory, RAM), a magnetic disk, an optical disk or the like.

As described above, the above embodiments are only to illustrate the technical solutions of the present disclosure, but not to limit the present disclosure. Although the present disclosure is illustrated in detail according to the above embodiments, it should be understood by those ordinarily skilled in the art that, various modifications can be made to the technical solutions of the above embodiments or some of the technical features can be substituted equivalently, and the modifications or substitutions do not make the essence of corresponding technical solutions depart from the spirit or scope of the technical solutions of the embodiments of the present disclosure.

The invention claimed is:

1. A method for automatically diagnosing a sorter fault, comprising:
    obtaining banknote images of banknotes by scanning;
    performing data processing on the banknote images based on a preset detection algorithm, to obtain processing results; and
    sending feedback information, in a case that the processing result meets a preset condition;
    wherein the performing data processing on the banknote images based on a preset detection algorithm to obtain processing results comprises:
    for each of the banknote images,
        obtaining the number of pixels of a grayscale histogram of the banknote image;
        obtaining a lower limit of a grayscale interval based on a preset lower limit of a ratio and the number of pixels;
        obtaining an upper limit of the grayscale interval based on a preset upper limit of the ratio and the number of pixels;
        calculating a mean value of the grayscale based on the lower limit of the grayscale interval and the upper limit of the grayscale interval; and
        recording the banknote image in an overexposure record, in a case that the mean value of the grayscale meets a preset overexposure condition.

2. The method according to claim 1, wherein the sending feedback information in a case that the processing result meets the preset condition comprises:

sending the feedback information in a case that the number of banknote images in the overexposure record reaches a preset third value.

3. A device for automatically diagnosing a sorter fault, comprising a processor and a memory storing program codes, wherein the processor performs the stored program codes to:

obtain banknote images of banknotes by scanning;

perform data processing on the banknote images based on a preset detection algorithm to obtain processing results; and send feedback information in a case that the processing result meets a preset condition;

wherein the processor further performs the stored program codes to:

for each of the banknote images, obtain the number of pixels of a grayscale histogram of the banknote image;

obtain a lower limit of a grayscale interval based on a preset lower limit of a ratio and the number of pixels;

obtain an upper limit of the grayscale interval based on a preset upper limit of the ratio and the number of pixels;

calculate a mean value of the grayscale based on the lower limit of the grayscale interval and the upper limit of the grayscale interval; and record the banknote image in an overexposure record in a case that the mean value of the grayscale meets an overexposure condition;

and send feedback information in a case that the number of banknote images in the overexposure record reaches a preset third value.

4. A device for automatically diagnosing a sorter fault, comprising a processor and a memory storing program codes, wherein the processor performs the stored program codes to:

obtain banknote images of banknotes by scanning;

perform data processing on the banknote images based on a preset detection algorithm to obtain processing results; and send feedback information in a case that the processing result meets a preset condition;

wherein the processor further performs the stored program codes to:

for each of the banknote images, obtain the number of pixels of a grayscale histogram of the banknote image;

obtain a lower limit of a grayscale interval based on a preset lower limit of a ratio and the number of pixels;

obtain an upper limit of the grayscale interval based on a preset upper limit of the ratio and the number of pixels;

calculate a mean value of the grayscale based on the lower limit of the grayscale interval and the upper limit of the grayscale interval; and record the banknote image in an overexposure record in a case that the mean value of the grayscale meets an overexposure condition.

* * * * *